(12) United States Patent
Chung et al.

(10) Patent No.: US 7,338,105 B2
(45) Date of Patent: Mar. 4, 2008

(54) ARTICLE BOX FOR A BEACH BUGGY

(75) Inventors: Chieh Lin Chung, Tainan Hsien (TW); Hui-Huay Huang, Tainan (TW); Wen Chang Chen, Tainan Hsien (TW)

(73) Assignee: Aeon Motor Co., Ltd., Tainan Hsien (TW)

( * ) Notice: Subject to any disclaimer, the term of this patent is extended or adjusted under 35 U.S.C. 154(b) by 181 days.

(21) Appl. No.: 11/215,082

(22) Filed: Aug. 31, 2005

(65) Prior Publication Data

US 2007/0046055 A1    Mar. 1, 2007

(51) Int. Cl.
*B60R 11/06* (2006.01)
(52) U.S. Cl. ..................... 296/37.1; 180/219
(58) Field of Classification Search ............... 296/37.1; 224/521, 282, 537
See application file for complete search history.

(56) References Cited

U.S. PATENT DOCUMENTS

| | | | | |
|---|---|---|---|---|
| 3,554,311 A | * | 1/1971 | Thompson et al. | 180/220 |
| 4,325,562 A | * | 4/1982 | Yamada et al. | 296/37.1 |
| 4,826,057 A | * | 5/1989 | Yamada | 224/412 |
| 4,964,483 A | * | 10/1990 | Yokoyama et al. | 180/219 |
| 5,025,883 A | * | 6/1991 | Morinaka et al. | 180/219 |
| 5,064,016 A | * | 11/1991 | Iwai et al. | 296/37.1 |
| 5,076,387 A | * | 12/1991 | Oka | 296/37.1 |
| 5,083,632 A | * | 1/1992 | Saito et al. | 296/37.1 |
| 5,107,952 A | * | 4/1992 | Matsubayashi et al. | 296/37.1 |
| 5,433,286 A | * | 7/1995 | Kumamaru et al. | 180/219 |
| 6,332,639 B1 | * | 12/2001 | Tanaka et al. | 296/37.1 |
| 6,623,071 B2 | * | 9/2003 | Kawamoto et al. | 297/195.13 |
| 6,874,590 B2 | * | 4/2005 | Rondeau et al. | 180/89.1 |
| 7,028,800 B2 | * | 4/2006 | Yagisawa et al. | 180/219 |
| 2005/0098596 A1 | * | 5/2005 | Yano et al. | 224/413 |

* cited by examiner

*Primary Examiner*—Kiran B. Patel
(74) *Attorney, Agent, or Firm*—Bacon & Thomas, PLLC

(57) ABSTRACT

An article box for a beach buggy is positioned under the rear end of the saddle of a beach buggy. The frame body of the beach buggy is partitioned and formed with an uncovered accommodating space, and the article box with its opening facing upward is embedded in the accommodating space and concealed under the saddle of the beach buggy. By so designing, after the saddle of the beach buggy is pulled open, the driver can put his safety helmet or other things into the article box, convenient in use.

3 Claims, 4 Drawing Sheets

ARTICLE BOX FOR A BEACH BUGGY

BACKGROUND OF THE INVENTION

1. Field of the Invention

This invention relates to an article box for a beach buggy, particularly to one facilitating a driver to put his safety helmet or other articles therein.

2. Description of the Prior Art

For the sake of safety, it is prescribed that the driver of a beach buggy must wear a safety helmet. However, a conventional beach buggy is provided with no article box; therefore, after finishing riding and taking off the safety helmet, the driver can only hang his safety helmet on the beach buggy or place it at a definite location, letting the safety helmet exposed to get wet in case of rain and or under the sunshine and contaminated to shorten its service life.

SUMMARY OF THE INVENTION

The objective of the invention is to offer an article box for a beach buggy for facilitating the driver to place therein his safety helmet or other articles that he carries along.

The feature of the invention is an uncovered accommodating space formed by partitioning the frame body of a beach buggy and positioned under the rear end of the saddle of the beach buggy. The article box with its opening facing upward is positioned in the accommodating space and concealed under the saddle of the beach buggy. Thus, after pulling open the saddle, the driver can put his safety helmet or other articles into the article box, convenient in use.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
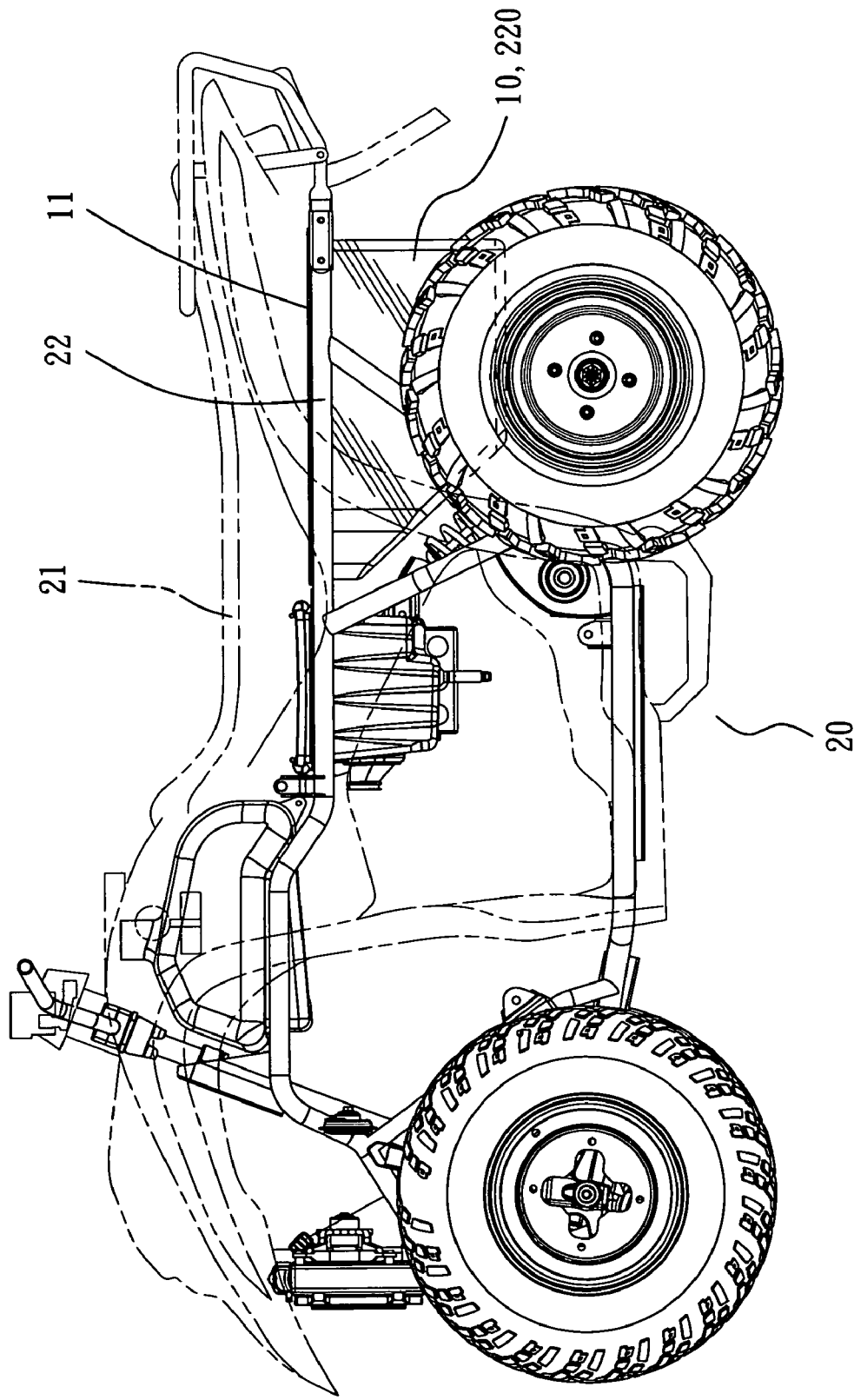
FIG. 1 is a side-sectional view of a first preferred embodiment of an article box for a beach buggy in the present invention.

A first preferred embodiment of an article box for a beach buggy in the present invention, as shown in FIG. 1, is to position the article box 10 under the saddle 21 of the beach buggy 20, with the opening of the article box facing upward. The frame body 22 of a beach buggy 20 is partitioned and formed with an uncovered accommodating space 220 under the rear end of the saddle 21, and the article box 10 is embedded in the accommodating space 220 from above and positioned therein, having its opening covered by the saddle 21.

Figure 2:
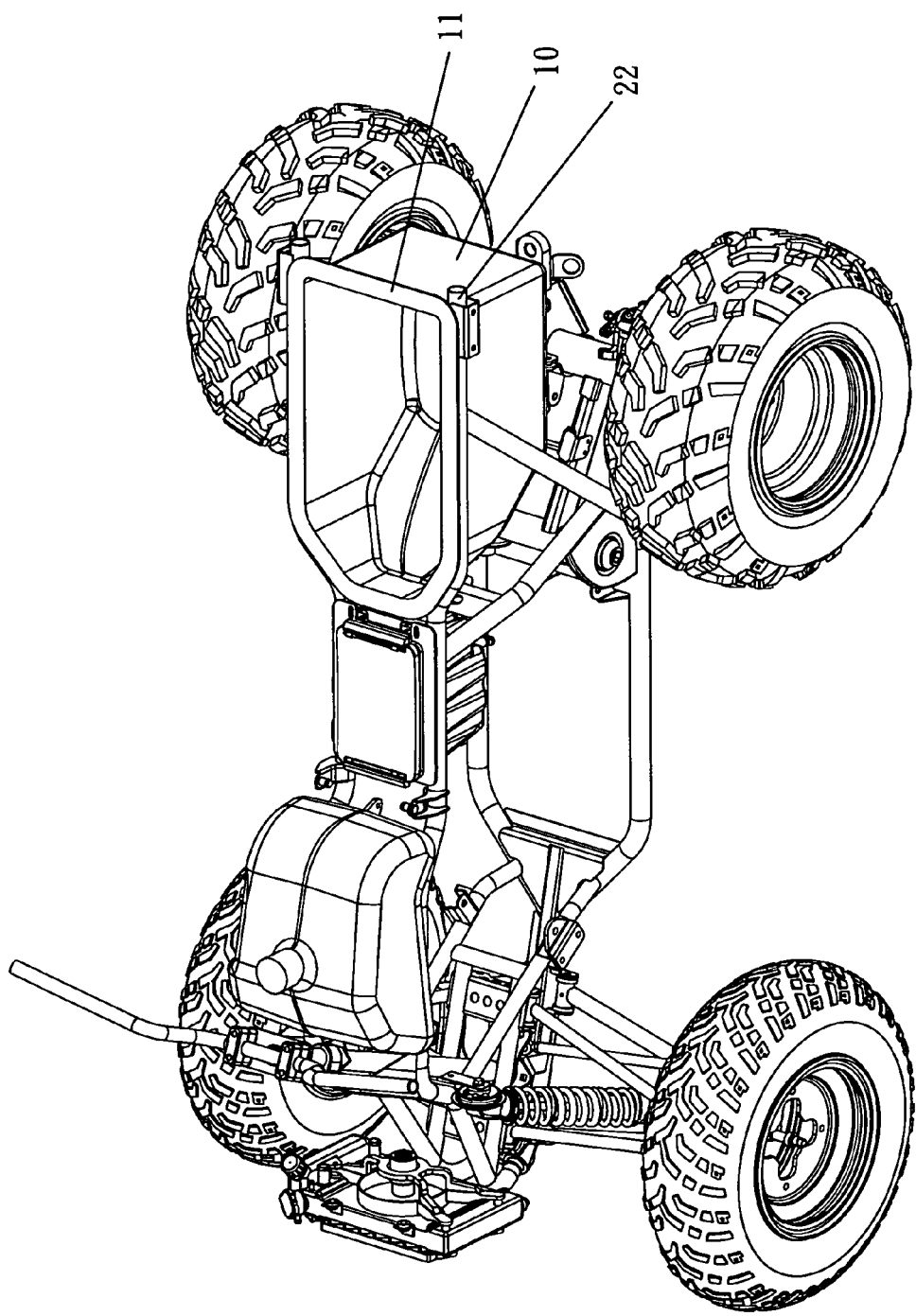
FIG. 2 is a perspective view of the first preferred embodiment of the article box for a beach buggy in the present invention.
Figure 3:
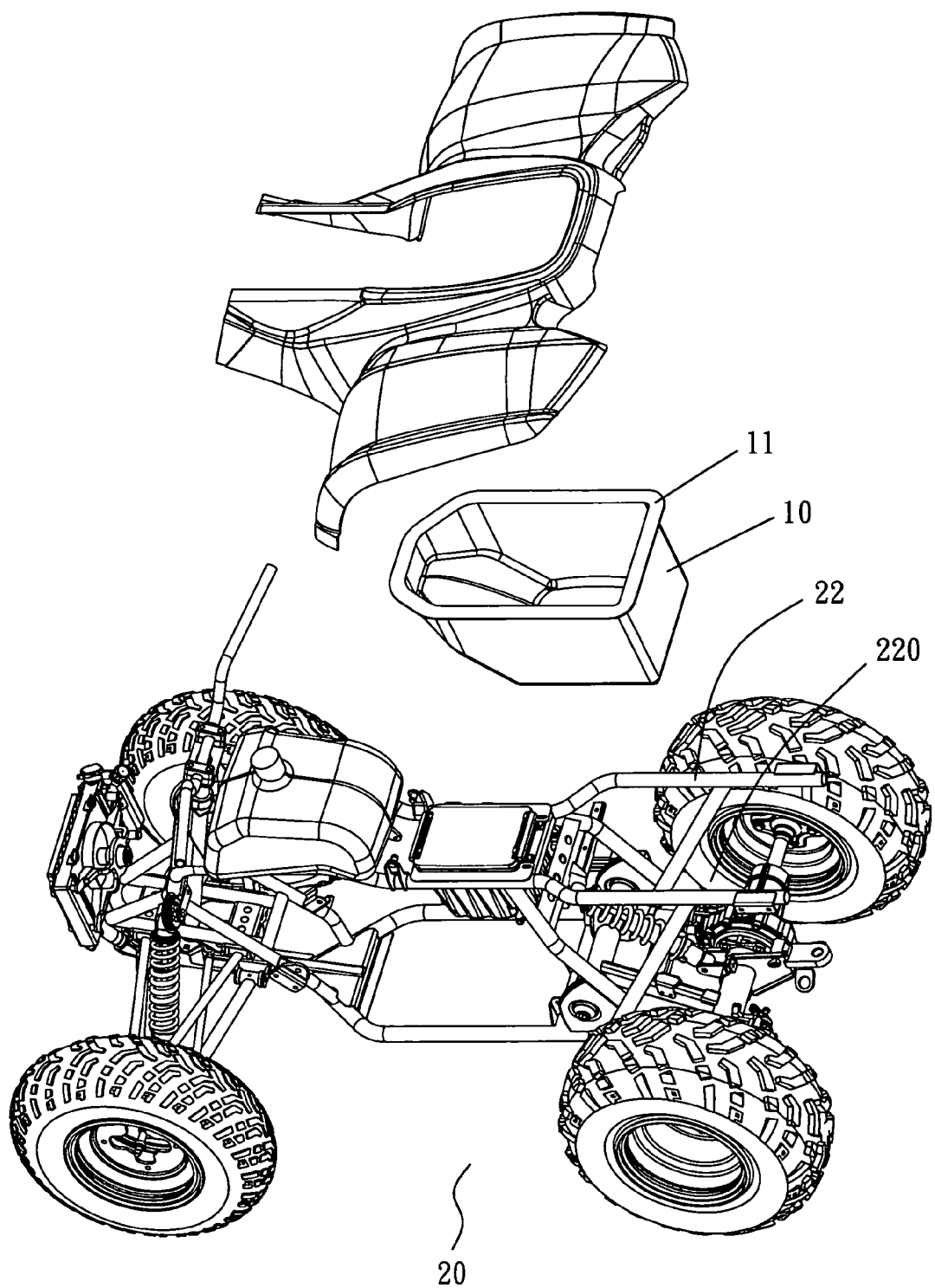
FIG. 3 is an exploded perspective view of the first preferred embodiment of the article box for a beach buggy in the present invention.

The article box 10, as shown in FIGS. 2 and 3, has the peripheral edge of its opening formed with a box rim 11 protruding outward to be held and positioned on the frame body 22 after the article box 10 is embedded in the accommodating space 220 of the beach buggy 20.

Figure 4:
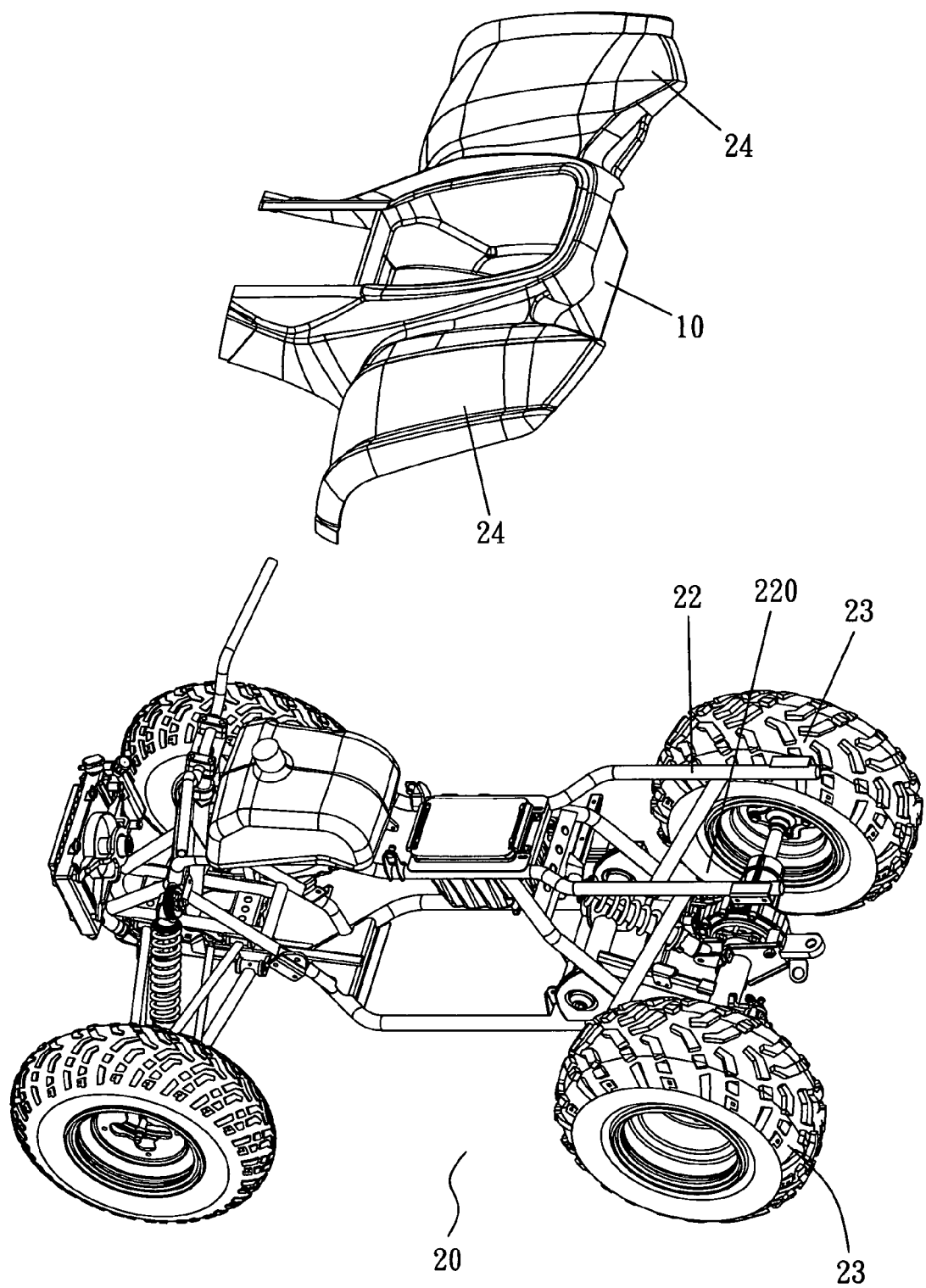
FIG. 4 is an exploded perspective view of a second preferred embodiment of an article box for a beach buggy in the present invention.

A second preferred embodiment of an article box 10 for a beach buggy in the present invention, as shown in FIG. 4, is to have the article box 10 formed integral with two mudguards 24 at two opposite sides above two rear wheels 23 of the beach buggy 20. The article box 10 has the peripheral edge of its opening positioned on the frame body 22 after the article box 10 is received in the accommodating space 220 of the frame body 22.

After assembling, the article box 10 having its upward opening covered by the saddle 21 is concealed in the interior of the beach buggy 20. In using, simply pull open the saddle 21 and put the safety helmet or other articles into the article box 10, convenient in use.

While the preferred embodiments of the invention have been described above, it will be recognized and understood that various modifications may be made therein and the appended claims are intended to cover all such modifications that may fall within the spirit and scope of the invention.

We claim:

1. An article box for a beach buggy having at least two rear wheels, the article box being positioned between the at least two rear wheels and under approximately a rear half of a saddle of the beach buggy, a frame body of said beach buggy being partitioned and formed with an uncovered accommodating space between the at least two rear wheels, said article box embedded and positioned in said accommodating space, said article box having its opening facing upward, said article box being concealed under said saddle of said beach buggy, wherein the saddle is pulled open to provide access to the article box.

2. The article box for a beach buggy as claimed in claim 1, wherein said article box has a peripheral edge formed with a box rim protruding outward to be held and positioned on said frame body of said beach buggy.

3. The article box for a beach buggy as claimed in claim 1, wherein said article box is formed integral with two mud guards at two opposite sides above the two rear wheels of said beach buggy.

* * * * *